United States Patent
Dees et al.

(10) Patent No.: US 10,863,233 B2
(45) Date of Patent: Dec. 8, 2020

(54) WIRELISS DOCKING SYSTEM FOR AUDIO-VIDEO

(71) Applicant: KONINKLIJKE PHILIPS N.V., Eindhoven (NL)

(72) Inventors: Walter Dees, Eindhoven (NL); Henricus Theodorus Johannus Antonius Gerardus Van Der Sanden, Sint-Oedenrode (NL)

(73) Assignee: Koninkllijke Philips N.V., Eindhoven (NL)

( * ) Notice: Subject to any disclaimer, the term of this patent is extended or adjusted under 35 U.S.C. 154(b) by 113 days.

(21) Appl. No.: 14/770,838

(22) PCT Filed: Mar. 7, 2014

(86) PCT No.: PCT/EP2014/054410
§ 371 (c)(1),
(2) Date: Aug. 27, 2015

(87) PCT Pub. No.: WO2014/135670
PCT Pub. Date: Sep. 12, 2014

(65) Prior Publication Data
US 2016/0007080 A1 Jan. 7, 2016

(30) Foreign Application Priority Data
Mar. 8, 2013 (EP) .................................. 13158283

(51) Int. Cl.
*H04N 7/16* (2011.01)
*H04N 21/4363* (2011.01)
(Continued)

(52) U.S. Cl.
CPC ..... *H04N 21/43637* (2013.01); *H04L 47/783* (2013.01); *H04N 7/147* (2013.01);
(Continued)

(58) Field of Classification Search
CPC ........... H04N 21/4104; H04N 21/4126; H04N 21/42203; H04N 21/4367;
(Continued)

(56) References Cited

U.S. PATENT DOCUMENTS 6,278,499 B1 * 8/2001 Darbee ................... G06F 3/147
348/734
7,559,031 B2 7/2009 Kawamura
(Continued)

FOREIGN PATENT DOCUMENTS

EP 2532399 A1 12/2012
GB 2486425 A 6/2012
(Continued)

OTHER PUBLICATIONS

Leppilahti J. et al, "Remote UI Protocols for Home Environment", TKK T-110.5190 Seminar on Internetworking, May 3, 2007 (May 3, 2007). XP055049595.

*Primary Examiner* — Pankaj Kumar
*Assistant Examiner* — Timothy R Newlin

(57) ABSTRACT

A host device (300) provides wireless docking to a dockee device (250). The host has a remote client unit (210) for providing at least one audio/video (AV) rendering function to an application (252) via remote server unit (251) in a dockee device. The host has transfer units (211,212,213,214) arranged for enabling transmitting a downstream of first AV data to the dockee device, and receiving an upstream of second AV data to be rendered from the dockee device. The host device has an AV router (310) for processing the downstream and the upstream so as to replace first AV data in the downstream by a predetermined pattern before transmitting the downstream to the dockee device, and replace at least part of second AV data in the upstream by at least part of the first AV data after receiving the upstream from the
(Continued)

dockee device and before rendering the AV data. Advantageously required bandwidth is reduced in the wireless communication.

11 Claims, 4 Drawing Sheets

(51) Int. Cl.
    *H04N 7/14*           (2006.01)
    *H04N 21/2343*      (2011.01)
    *H04N 21/238*       (2011.01)
    *H04N 21/41*        (2011.01)
    *H04N 21/414*       (2011.01)
    *H04N 21/4223*      (2011.01)
    *H04N 21/4402*      (2011.01)
    *H04L 12/911*       (2013.01)
    *H04N 21/233*       (2011.01)
    *H04N 21/234*       (2011.01)
    *H04N 21/239*       (2011.01)
    *H04N 21/4143*      (2011.01)
    *H04N 21/426*       (2011.01)
    *H04N 21/437*       (2011.01)
    *H04N 21/438*       (2011.01)
    *H04W 4/18*        (2009.01)

(52) U.S. Cl.
CPC ......... *H04N 21/233* (2013.01); *H04N 21/238* (2013.01); *H04N 21/239* (2013.01); *H04N 21/23418* (2013.01); *H04N 21/234345* (2013.01); *H04N 21/4122* (2013.01); *H04N 21/4143* (2013.01); *H04N 21/41407* (2013.01); *H04N 21/4223* (2013.01); *H04N 21/42653* (2013.01); *H04N 21/437* (2013.01); *H04N 21/438* (2013.01); *H04N 21/440245* (2013.01); *H04W 4/18* (2013.01); *G06F 2203/0384* (2013.01)

(58) Field of Classification Search
CPC ....... H04N 21/43615; H04N 21/43622; H04N 21/4363; H04N 21/44016; H04N 21/4402; H04N 21/440245
See application file for complete search history.

(56) References Cited

U.S. PATENT DOCUMENTS

| | | | |
|---|---|---|---|
| 7,720,439 B2 | 5/2010 | Wang | |
| 8,019,883 B1* | 9/2011 | Margulis | G06F 1/266 370/450 |
| 8,395,706 B2 | 3/2013 | Toba | |
| 8,402,135 B2 | 3/2013 | Kondo | |
| 2002/0031120 A1* | 3/2002 | Rakib | G08B 13/19656 370/386 |
| 2003/0027517 A1* | 2/2003 | Callway | G06F 3/14 455/3.01 |
| 2003/0065806 A1 | 4/2003 | Thomason | |
| 2003/0233663 A1* | 12/2003 | Rao | H04N 5/76 725/131 |
| 2005/0213593 A1* | 9/2005 | Anderson | H04L 29/06027 370/419 |
| 2006/0088022 A1* | 4/2006 | Hogyoku | H04N 21/2543 370/349 |
| 2007/0086724 A1* | 4/2007 | Grady | H04N 5/765 386/230 |
| 2007/0189711 A1* | 8/2007 | Ash | H04N 5/765 386/200 |
| 2007/0262973 A1 | 11/2007 | Wan | |
| 2007/0263865 A1* | 11/2007 | Cohen | G11B 27/034 380/201 |
| 2008/0076470 A1* | 3/2008 | Ueda | H04N 21/4126 455/556.1 |
| 2008/0120681 A1* | 5/2008 | Sibley | H04N 7/088 725/136 |
| 2008/0212971 A1* | 9/2008 | Shaanan | H04B 10/1141 398/130 |
| 2009/0187957 A1* | 7/2009 | Avkarogullari | H04N 5/775 725/109 |
| 2010/0265392 A1* | 10/2010 | Shao | H04N 7/012 348/446 |
| 2010/0321466 A1* | 12/2010 | Roman | H04N 21/41407 348/14.02 |
| 2010/0333004 A1 | 12/2010 | Kristiansen | |
| 2011/0188391 A1 | 8/2011 | Sella | |
| 2011/0317921 A1 | 12/2011 | Tsukagoshi | |
| 2012/0042102 A1* | 2/2012 | Chung | H04M 1/7253 710/33 |
| 2012/0079551 A1* | 3/2012 | Isozaki | H04N 21/4104 725/118 |
| 2012/0123868 A1 | 5/2012 | Brudnicki | |
| 2013/0047189 A1* | 2/2013 | Raveendran | H04N 21/23 725/81 |
| 2013/0208185 A1* | 8/2013 | Ishihara | G09G 5/006 348/552 |
| 2013/0312042 A1* | 11/2013 | Shaw | H04N 21/23439 725/62 |
| 2014/0092304 A1* | 4/2014 | Chen | H04N 21/4126 348/552 |

FOREIGN PATENT DOCUMENTS

| | | |
|---|---|---|
| JP | 2004135062 A | 4/2004 |
| JP | 2013005155 A | 1/2013 |
| WO | WO2012123868 A1 | 9/2012 |

* cited by examiner

WIRELISS DOCKING SYSTEM FOR AUDIO-VIDEO

FIELD OF THE INVENTION

The invention relates to a host device for wireless docking with a dockee device, the host device being arranged for rendering audio or video (AV) data. The invention further relates to a dockee device for wireless docking to a host device, a method and a computer program product for wireless docking between a host and a dockee device.

The host device comprises a host communication unit for accommodating wireless communication, a remote client unit for providing at least one AV rendering function to a remote client for enabling rendering the audio data via a sound device or the video data via a screen, and at least one transfer unit arranged for enabling transmitting a downstream of first AV data to the dockee device, and receiving an upstream of second AV data to be rendered from the dockee device. The dockee device comprises a dockee communication unit for accommodating the wireless communication, a remote server unit for cooperating with the remote client unit for enabling said AV rendering function, and an application unit for receiving of the downstream of AV data and for generating of the upstream of AV data.

The invention relates to the field of wireless communication, e.g. via Wi-Fi, and more specific to a setup for a wireless docking system having audio and/or video rendering capabilities.

BACKGROUND OF THE INVENTION

Wired docking stations for portable electronic devices typically have only a single physical docking connector to dock one device at a time. The docking station may provide the portable device with power and peripheral functions not provided by the device itself, for example a large(r) screen, high(er) quality speakers, mouse and keyboard.

Wireless docking is known, for example, from WO 2012/117306A1. A wireless docking station (called a host) enables a mobile device (called a dockee) to access to its peripherals via wireless communication between the dockee device and the host device. The wireless docking station enables applications in the dockee device to receive audio and/or video (AV) data. The AV data may originate from the peripherals or external sources of the host, and is transferred in the direction of the dockee device in a data stream, usually called downstream. The application in the dockee device may add or process the AV data, and or generate AV data, and send a stream of AV data to the host device, usually called upstream.

SUMMARY OF THE INVENTION

Due to the wireless nature of the communication in the wireless docking system the available bandwidth is limited. However, in the known wireless docking systems, the up- and downstream containing the audio and/or video data are transferred simultaneously between the host and a dockee.

It is an object of the invention to provide a system for wireless docking that reduces the required bandwidth for AV functions in wireless docking.

For this purpose, a wireless docking system comprises a host device and a dockee device as described in the opening paragraph. According to a first aspect of the invention, the host device comprises an AV router arranged for processing the downstream and the upstream so as to replace the first AV data by a predetermined pattern before transmitting the downstream to the dockee device, and replace at least part of the second AV data by at least part of the first AV data after receiving the upstream from the dockee device and before rendering via said AV rendering function. The AV router is arranged for recognizing the predetermined pattern in the second AV data, and replacing the second AV data corresponding to said recognized pattern by at least part of the first AV data.

For this purpose, according to a further aspect of the invention, the dockee device the dockee device is arranged for including, as part of the upstream, the predetermined pattern into the second AV data. The predetermined pattern is part of the upstream by the virtue of the dockee device including the predetermined pattern into the second AV data, and the AV router is arranged for recognizing the predetermined pattern in the second AV data, and replacing the second AV data corresponding to said recognized pattern by at least part of the first AV data. Advantageously, the AV router may insert the predetermined pattern in the downstream and replace the returned pattern in the upstream by the originally intended AV data.

The measures have the following effect. By replacing the original AV data in the first AV data of the downstream by the predetermined pattern the required bandwidth of the downstream is reduced, because the predetermined pattern is transferred using less video data. Also, the bandwidth required for the upstream is reduced, because the predetermined pattern, which is inserted by an application in second AV data of the upstream, is transferred using less video data. In the host device, the inserted pattern is replaced by the original video content as intended, and the resulting second AV data are used for rendering. Advantageously, the amount of data that needs to be transferred via the wireless communication is reduced.

Optionally, the AV router is arranged for receiving rendering commands from the dockee device, the rendering commands being indicative of said replacing at least part of the second AV data by at least part of the first AV data. Advantageously, the AV router subsystem may use the information received from the dockee about the intended use of the content of the AV input and output peripherals connected to the second wireless device to determine a routing path which has minimal duplication of content being sent back and forth between the first and second wireless device.

Optionally, the dockee device comprises a dockee router for routing and processing the upstream and the downstream in the dockee device and for communicating with the AV router so as to exchange routing control commands so as to determine the AV routing as supported by the host device.

Optionally, the predetermined pattern includes at least one of a video pattern having a single background color;
a video pattern having one or more geometrical objects;
a video pattern having a single foreground color;
an audio pattern of silence;
an audio pattern of a sequence of predetermined sounds;
temporal information, and the AV router is arranged for using the temporal information to determine a delay between sending the first data in the downstream and receiving the second AV data in the upstream, and delaying AV content from the AV input device according to the determined delay before said replacing so as to synchronize the AV data to be rendered. Advantageously, by selecting the pattern using respective above elements, the required bandwidth is reduced and the pattern enables recognition by the AV router.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

A detailed implementation example for a wireless docking system is discussed now. Wireless docking is about enabling portable or mobile devices (so called wireless dockees or WDs) to wirelessly connect to a group of peripherals, so that applications on the dockee device can make use of these peripherals to improve the experience and productivity of working/interacting with these applications. The interfacing to the peripherals is performed by a so-called wireless docking host (WDH).

Possible dockees include (but are not limited to) mobile phones, laptops, tablets, portable media players, cameras, electronic watches. Possible WDHs include (but are not limited to) dedicated wireless docking station devices, display devices, audio devices, printers, PCs. Possible peripherals include (but are not limited to) wireless mice, keyboards, display devices, audio devices, webcams, printers, storage devices, USB hubs.

Figure 1:
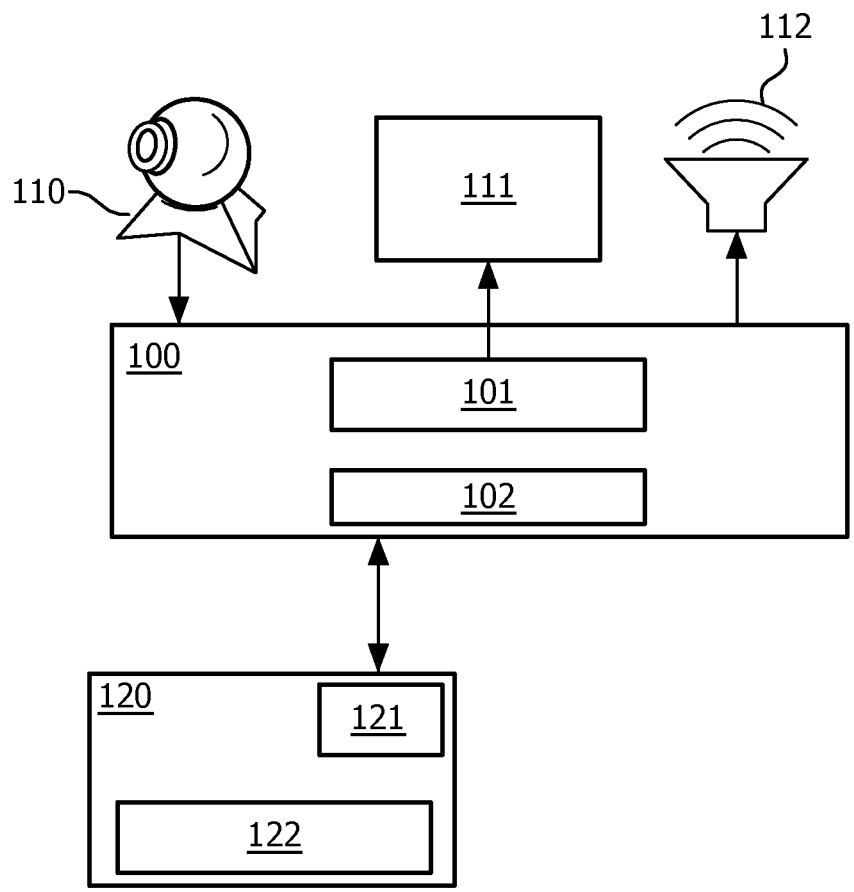
FIG. 1 shows a wireless docking system.

FIG. 1 shows a wireless docking system. The prior art system includes a host device 100 for wireless communication with a dockee device 120, for example a mobile phone, laptop or tablet computer. The dockee device 120 is described in detail below. The host device is coupled to a number of peripherals 110,111,112 for rendering audio or video (AV) data. It is noted that in this document AV data is used for any type of video data, audio data or a combination of video and audio data. The peripherals may include video output devices like a beamer or a display screen 111, video input devices like a camera or webcam 110, in graphical interactive devices like a touch screen, audio input/output devices like a loudspeaker system 112, a headphone and/or a microphone, user control devices like a mouse, a 3D gesture detection device or a room control unit; data processing devices like a data storage unit or a printer.

The host device 100 has a host communication unit 102 for accommodating said wireless communication, for example a WiFi unit, well known as such. The host device further has a docking processor 101 arranged for docking at least one dockee device. The process of docking a wireless device to a wireless docking host (WDH) is a process of establishing a data link via the available radio channel such as WiFi, Wireless Serial Bus or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more peripherals for the dockee device.

The dockee device 120 has a dockee communication unit 121 for accommodating said wireless communication with the host. The dockee device further has a dockee processor 122 arranged for docking, as a dockee device, with the host device for getting access to the at least one peripheral.

In wireless docking, a dockee device connects wirelessly to a docking station (also known as wireless docking host or WDH), in order to hook up to peripherals (e.g. a screen, keyboard) provided by the docking station. The devices are expected to support WiFi, for example the version 'n' (as defined in IEEE 802.11n). WiFi 'n' has the disadvantage however that the supported data rate is not high enough to support some wireless docking use cases. For example, to smoothly play video games in a docked situation in the high definition screen of the docking station, a screen update rate of e.g. 1280×1920 pixels with 24 bit per pixel at 60 Hz needs to be supported: this amounts to a data rate of 3375 Mbit/s, way beyond the 300 Mbit/s promised in the most advanced WiFi 'n' setup. Furthermore, the available bandwidth typically will have to be shared amongst multiple peripherals connected to the wireless docking station (such as USB webcam, storage or audio devices). One way to solve the bandwidth problem is to use compression (such as H.264 to compress the display output). However, this adds to the resources needed in the dockee and docking station, adds to the latency of the user interaction with the I/O peripherals provided by the docking station. It also reduces the quality of for example the display output. Due to limitations to the amount of compression that can be applied, it is therefore important to reduce the amount of traffic needed between the dockee and the docking host as much as possible.

Figure 2:
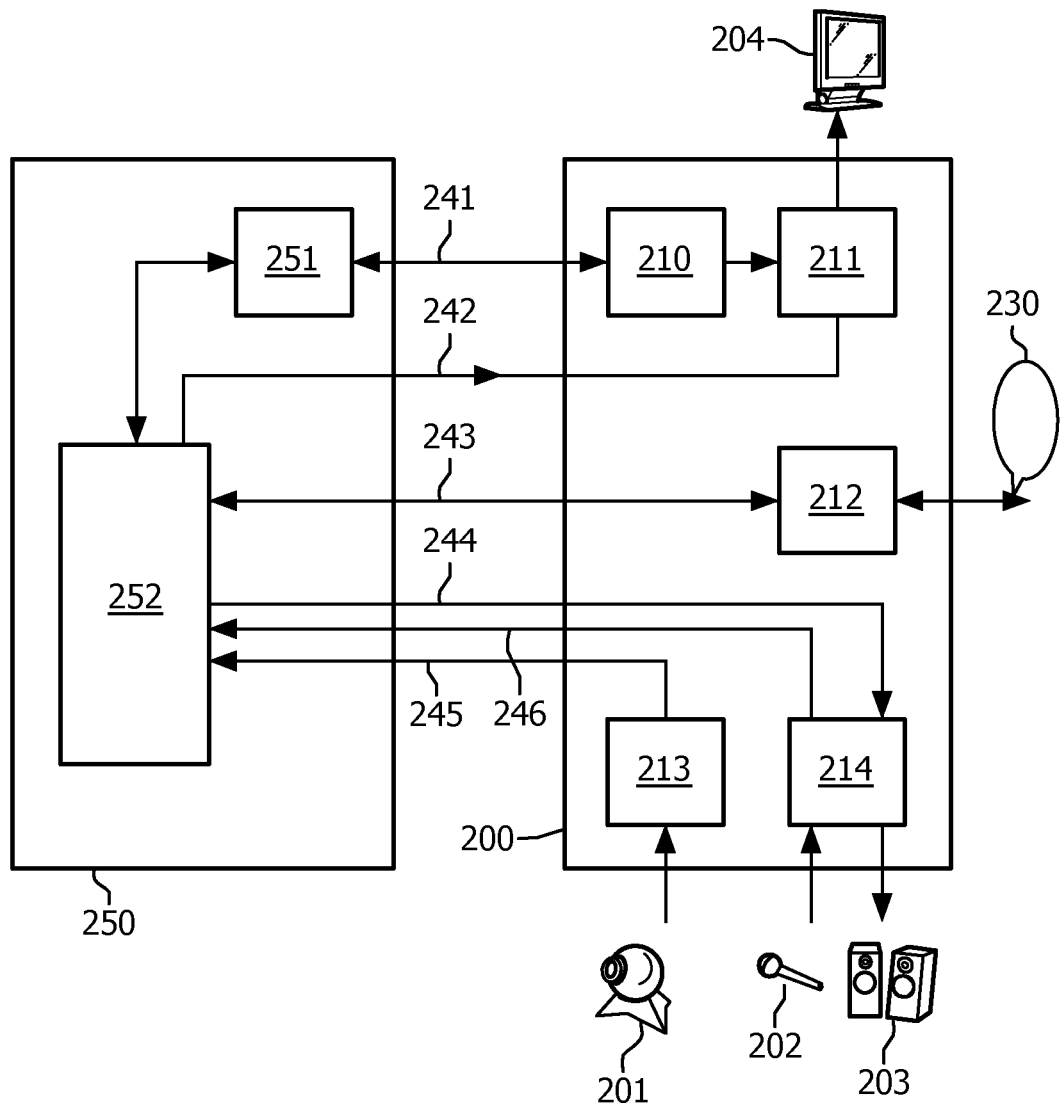
FIG. 2 shows a docking system rendering AV data as provided by an application in a dockee.

FIG. 2 shows a docking system rendering AV data as provided by an application in a dockee. A prior art wireless docking host 200 is arranged for wireless communication with a dockee device 250, and for rendering audio or video (AV) data, similar to FIG. 1 above. The host device has a host communication unit for accommodating said wireless communication, and a remote client unit 210 for providing at least one AV rendering function to a remote client as indicated by arrow 241. It is noted that the remote client unit and the remote server unit communicate to exchange control data, but video data is assumed to be streamed from the dockee to the host, so called upstream. Data streaming from the host to the dockee is called downstream. The host device has at least one transfer unit 211,212,213,214 arranged for enabling transmitting a downstream of first AV data to the dockee device. At least one of the transfer units is further arranged for receiving an upstream of second AV data to be rendered from the dockee device.

In the example in the figure a first transfer unit is an video output unit 211 coupled to a display screen 204, which is receiving a upstream of video data as indicated by arrow 242. A second transfer unit is a network input/output unit 212 interfacing to a network 230 like the internet, transferring a further upstream and/or downstream of AV data. A third transfer unit is a video input unit 213 coupled to a camera 201, which is transmitting an upstream of video data as indicated by arrow 245. A fourth transfer unit is an audio unit interfacing to a microphone 202 for audio input which is transmitting a downstream of audio data as indicated by arrow 246, and also coupled to a loudspeaker system 203 for audio output for receiving an upstream of audio data as indicated by arrow 244.

The dockee device has a remote server unit 251 for cooperating with the remote client unit 210 for enabling said AV rendering function. The dockee device also has an application unit 252 for receiving of the first stream of AV data and for generating of the second stream of AV data based on the first stream of AV data. In practice the application unit may be a processor running an application or socalled app that receives and/or transmits audio and/or video data.

Streaming high resolution video over a network connection may require a very large bandwidth. As illustrated by FIG. 2, for display output the video content is sent from the dockee to the docking station to enable the docking station rendering it on a connected display peripheral. If a camera peripheral is connected to a docking station, the video content may be sent from the docking station to the dockee. Usually, the webcam output is inserted by a dockee application in the video output as part of a user interface without further processing. If the display connected to the docking station is used to render the user interface, this means that the video content from the webcam has to be streamed up and down from docking station to dockee and back to be able to display it on a monitor, thereby using unnecessary bandwidth.

The system described below can be used in wireless docking devices to decrease the bandwidth used by reducing the uplink bandwidth, and reducing the downlink bandwidth for this situation, and possibly other situations as well.

Figure 3:
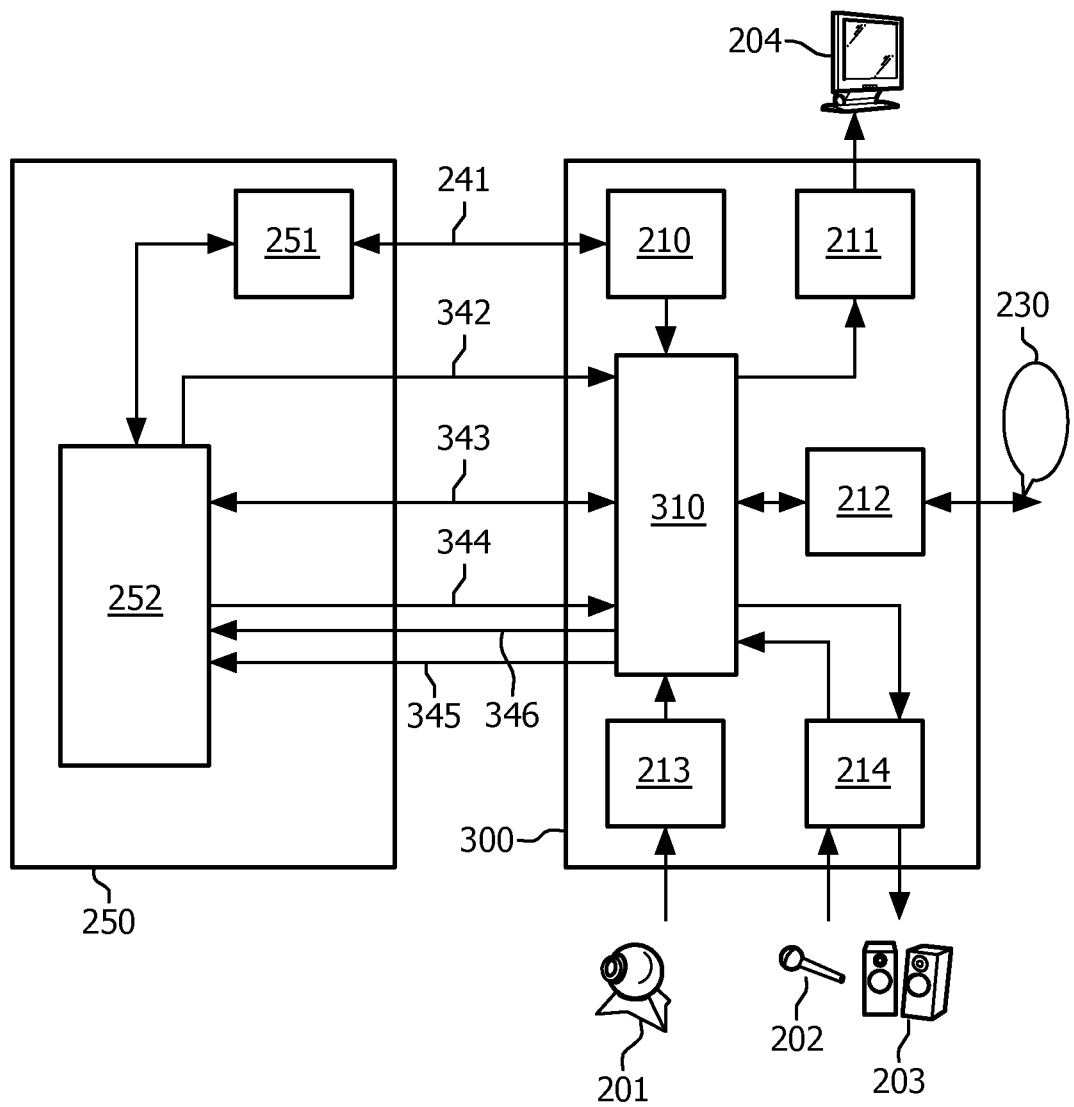
FIG. 3 shows a docking system rendering AV data via an AV router.

FIG. 3 shows a docking system rendering AV data via an AV router. Similar to FIG. 2 a wireless docking host 300 is arranged for wireless communication with a dockee device 250. The host device has an AV router 310 arranged for processing the upstream and the downstream so as to replace the first AV data by a predetermined pattern before transmitting the downstream to the dockee device, and replace at least part of the second AV data by at least part of the first AV data after receiving the upstream from the dockee device and before rendering via said AV rendering function.

In the example in the figure the host has the same transfer units as the host device 200 in FIG. 2. The host device 300 further has an AV router 310 arranged for processing the downstream and the upstream so as to replace the first AV data by a predetermined pattern before transmitting the downstream to the dockee device, and replace at least part of the second AV data by at least part of the first AV data after receiving the upstream from the dockee device and before rendering via said AV rendering function. Now the video output unit 211 is receiving a processed stream of video data via the AV router as indicated by arrow 342. The network input/output unit 212 is transferring a further upstream and/or downstream 343 of AV data after processing via the AV router. The video input unit 213 is transmitting, via the AV router, a downstream of video data as indicated by arrow 345. The audio unit 214 is transmitting, via the AV router, a downstream of audio data as indicated by arrow 346, and is receiving, via the AV router, an upstream of audio data as indicated by arrow 344.

The main element of the invention is a system consisting of a first wireless device running one or more applications, the wireless device being connected to a second wireless device that is connected to one or more AV input peripherals, and one or more AV output peripherals, whereby the system can automatically determine a routing path based upon the content coming from the AV input peripherals and the content delivered to the AV output peripherals, with minimal duplication of content being sent back and forth between the first and second wireless device.

In an embodiment, the system consists of a first wireless device, usually dockee, and a second wireless device, usually stationary like a PC. The second wireless device is connected to at least one audiovisual input peripheral and audiovisual output peripheral and has an AV router subsystem with a processing unit to which the input and output peripherals are coupled. The subsystem controls rendering the audiovisual content received directly from the AV input peripheral or an external source (e.g. home network/Internet) on the AV output peripheral connected to the second wireless device.

Optionally, the AV router may use rendering instructions (e.g. area of the screen) provided by the dockee device. The AV router subsystem may use the information received from the dockee about the intended use of the content of the AV input and output peripherals connected to the second wireless device to determine a routing path which has minimal duplication of content being sent back and forth between the first and second wireless device.

Optionally, the AV router is arranged for receiving rendering commands from the dockee device, e.g. from remote server unit. The rendering commands may be indicative of said replacing at least part of the second AV data by at least part of the first AV data. The rendering commands may include video rendering commands, such as a command indicative of an area of the screen for rendering the first AV data;

a command indicative of an area of the first AV data to be rendered on the screen;

a command indicative of a AV pattern in the second AV data indicative of the rendering area;

a command indicative of a reference point for rendering the first AV data;

a command indicative of a visual marker to be detected in the second AV data for positioning the first AV data;

a command indicative of an indicator for selecting a predefined location for rendering the first AV data.

Optionally, the rendering instructions as provided by the dockee device, include one or more of the following: compression codec to apply, a set of filters to apply, quality reduction parameters to apply, morphing to apply, synchronization/timing parameters to apply.

Furthermore, the rendering commands may include graphical rendering commands, such as a command indicative of a graphical element to be rendered;

a command indicative of a location of rendering a graphical element;

a command indicative of a time indication for starting, stopping or temporarily displaying a graphical element;

a command indicative of a graphical user interface for enabling interaction with a user;

a command indicative of graphical control elements for enabling control via a user action.

Such graphical rendering commands may relate to the display output, i.e. the display output showing the user interface of the application(s) running on the dockee. Such display output is being sent from the dockee device to the host device to be displayed on the A/V output device simultaneously with the re-routed A/V content from the A/V input device.

Furthermore, the rendering commands may include audio rendering commands, such as a command indicative of a gain factor for rendering audio data of the first AV data;

a command indicative of a mixing ratio for rendering a combination of audio data of the first AV data and audio data of the second AV data.

In practice, the rendering instructions may further include one or more of the following: a set of coordinates, mask, color key, dedicated commands (e.g. within the remote display protocol), reference point, visual marker, predefined location, icon, audio volume, etc. Furthermore, the rendering instructions may be given in relation to the display output structure, i.e. the display output showing the user interface of the application(s) running on the first wireless device. The display structure is sent from the dockee to the host to be displayed on the A/V output device simultaneously with the A/V content from an A/V input device as intercepted by the AV router.

Optionally, the rendering instructions include recognition instructions, and the host device processes the audiovisual content provided by the A/V input peripheral based on the recognition instructions provided by the first wireless device and may send the processing results to the dockee. The recognition instructions may include one or more of the following: image recognition, text recognition, speech recognition, motion recognition. Optionally, the processing results provided by the host include one or more of the following: written text (recognized to be part of the content coming from the A/V input peripheral), URL/URI, identifier string, icon, action identification.

Optionally, the system consists of a wireless dockee device and a wireless host device. The host may be connected, via Wi-Fi or Ethernet, to one or more external sources (e.g. home network/Internet). The AV router controls rendering audiovisual content received from the external source, e.g. on an A/V output peripheral.

Optionally, the AV router is arranged for recognizing the predetermined pattern only in a patterned area of a full screen display output, and replacing the second AV data in the patterned area by a corresponding amount of the first AV data. Furthermore, the AV router may be arranged for recognizing in the patterned area, a scaling and/or cropping of the predetermined pattern, processing the first AV data corresponding to the scaling and/or cropping, and replacing the second AV data in the patterned area by a corresponding amount of the processed first AV data.

In practice, an audiovisual pattern may also indicate the rendering area while being generated by dockee device in a known way, so that can be recognized by host device. The pattern may be generated by the host device and inserted as video data in the downstream. By the virtue of the dockee device also including that pattern in the display output, the pattern becomes part of the upstream and can be recognized by the host device.

Optionally, the host device generates a pattern that is sent to the dockee device as part of the A/V content; in effect the host device uses the pattern as returned in the upstream as part of a rendering instruction sent from the dockee device on how to display the original content from the A/V input device of the host. The use of such pattern is beneficial since the system achieves A/V throughput optimization without modification of the dockee device. Traditional remote desktop systems would require the application to send additional coordinate and scaling information to the rendering device. The dockee application replicates the received pattern as it would when receiving a video stream. Furthermore, selecting a suitable pattern makes it possible to highly compress the A/V stream back and forth between the first and second wireless device. For example, the pattern comprises at least one of: a black background, one or more white squares or rectangles, possibly having different sizes for detecting scaling and/or cropping of the pattern. Hence, the pattern may be indicative of the position of the A/V content, and whether or not the video is scaled and/or cropped by comparing the pattern originally sent from the rendering device to the sending device, and the pattern received back from the dockee device in the second video data.

Optionally, the pattern generated by the second wireless device includes temporal information that the second wireless device uses to determine the delay with which the A/V content from the A/V input device needs to be rendered on the A/V output device in order to be synchronized with the display output that is being sent from the first wireless device to the second wireless device.

In a further embodiment the system is a wireless docking system, the second wireless device being a wireless docking station and the first wireless device being a portable device (called wireless dockee) being docked to the wireless docking station.

Optionally, the rendering commands as send by the dockee device include information about additional streams with which the AV data in upstream should be multiplexed, or an indication of an external source or destination for the first and/or second AV data. The instructions may include one or more of the following: URL, URI, USB device identifier, SAMBA/CIFS/NFS/WEBDAV destination, Skype address, email address, IMS/SIP address, streaming destination (RTP). Optionally, the host device may transfer the second AV data to a destination via a network like the internet. The audiovisual content provided by the A/V input peripheral may be processed before sending it to the destination indicated by the first wireless device, using instructions provided by the first wireless device, e.g. a compression codec to apply. For example, the audiovisual content that is sent to a destination using instructions provided by the dockee and the audiovisual content that is received from an external source, e.g. a server the Internet, by the host may be packaged in a secure protocol such as Skype. The host may implement the secure protocol. The dockee will provide the necessary information such as a destination URL to the host for setting up the protocol connection. The host may route the audiovisual content based on the network connection information available in the dockee, e.g. TCP/IP port and protocol type.

Optionally, the host device implements a secure protocol server consisting of two secure protocol transceivers, and where the dockee is responsible for setting up a connection to the desired destination, e.g. a server on the Internet. In a wireless docking environment typically all network traffic originating from the dockee device will pass through the host device, so the dockee device is able to intercept the setup of the connection and route the connection to the first secure protocol transceiver to setup a secure connection to the first wireless device. The connection information received by the first secure protocol receiver is used by the host to set up a new connection with the second secure protocol transceiver to the original destination which was received from the dockee. The first secure protocol transceiver may be connected to the second secure protocol transceiver by means of an internal bus on which audiovisual content is not encrypted. Upon receiving audiovisual content via one of the secure protocol connections, the second wireless device replaces the audiovisual content with content from the connected audiovisual input peripherals before retransmission by means of the complementing secure protocol transceiver.

Optionally, the host device implements a generic secure protocol that can be controlled by the dockee, such as HTTPS. The dockee is responsible for setting up the connection to the desired destination. After establishing a connection to the desired destination the first wireless device sends the secure connection information (e.g. encryption key) to the second wireless device, together with instructions (e.g. SDP descriptor) how to setup the audiovisual stream (e.g. RTP) that can be made secure using the secure connection information received from the dockee.

Optionally, the dockee device has a subsystem which communicates information with the wireless host device, e.g. with the AV router, about the AV input and output peripherals and external sources connected to the wireless host device to determine a dockee routing path which has minimal duplication of content being sent back and forth between the wireless host and dockee devices. Such a dockee subsystem is called a dockee router.

Figure 4:
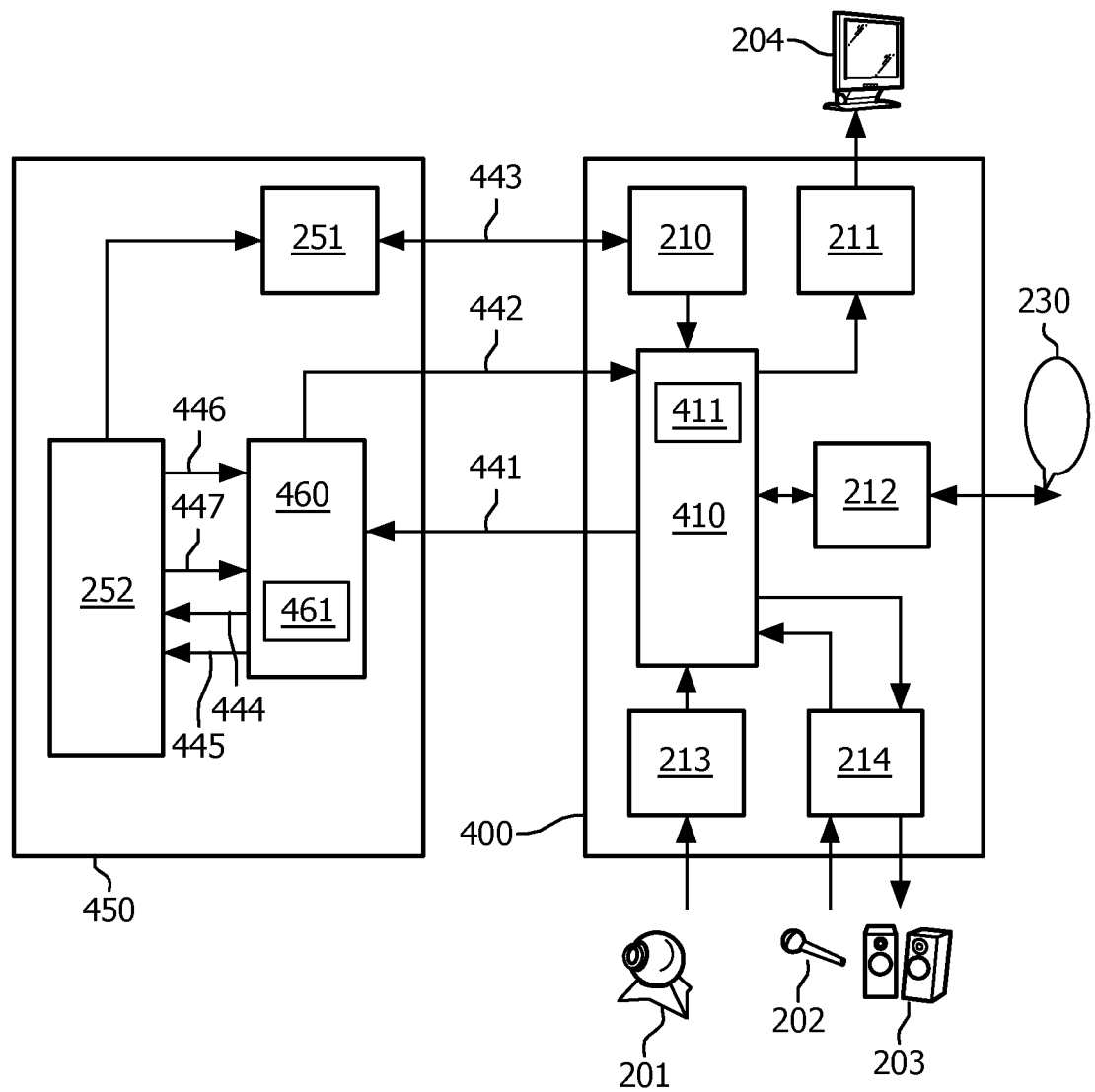
FIG. 4 shows an example of a wireless docking system having a dockee router unit.

FIG. 4 shows an example of a wireless docking system having a dockee router unit. In the figure the host has the same transfer units 211,212,213,214 and peripherals 201, 202,203,204 as the host device 200 in FIG. 2, and the dockee has the same remote server unit 251 for cooperating with the remote client unit 210 and application unit 252 as the dockee device 250 in FIG. 2. Similar to FIG. 3 the wireless docking host 400 is arranged for wireless communication with the dockee device 450. The host device has an AV router 410 arranged for processing the upstream 442 and the downstream 441 so as to replace the first AV data by a predetermined pattern before transmitting the downstream as modified to the dockee device. The dockee device has a dockee router 460 for routing and processing the upstream and the downstream in the dockee device. The AV router 410 is further arranged for processing the downstream and the upstream so as to replace at least part of the second AV data by at least part of the first AV data after receiving the upstream from the dockee device and before rendering via said AV rendering function.

In a practical example, an application in the dockee application unit 252 may want to use a webcam 201, microphone 202, display 204 and speaker(s) 203 and internet connection 230 of docking host 400 to set up a video conference. In FIG. 4 the dockee 450 is docked to the docking host 400. As part of the docking procedure the dockee and docking host exchange xml packaged service capability/request data that may include routing control commands, upon which the AV router 410 and/or the dockee router 460 can determine the AV throughput optimization capabilities supported by the docking host. After the dockee has determined that the docking host supports the desired peripheral capabilities, the dockee in this example will request the docking host to provide a display 204 for video playback, a webcam 201 for video recording, a microphone 202 for audio recording and speaker(s) 203 for audio playback. The dockee router may communicate to the docking AV router to establish a routing of audio and video from the AV input devices directly to the AV output devices, and instead to insert a predetermined pattern in the downstream. The routing may be based upon reception, by the dockee router, of system events which indicate that the application wants to use the available audio and video resources. Upon receiving, by the AV router, the request from dockee router the docking host will expose the requested peripherals to dockee and configure the A/V router to route video from webcam and/or video from internet connection directly to the display, and route audio from microphone directly to internet connection and audio originating from internet connection directly to speaker(s). The dockee router may provide a virtual webcam driver 461 to the dockee application so as to provide a first video pattern 444 and/or a virtual external AV driver to generate a stream with a second video pattern 445 which both may be used in the application. The video patterns may be provided and/or controlled via the predetermined pattern as indicated in the downstream 441 in the first AV data that replaces the original video data as inserted by the AV router 410.

When, in the example, the application is started on the dockee, an internet connection may be established with a remote site, also running a video conferencing application. An AV stream originating from the remote internet source is routed by the AV router, e.g. captured in audio video multiplexer and multiplexed with Remote Desktop Output 443 originating from the dockee. The user interface of the application, comprising video data 447 and/or audio data 446, and still containing said predetermined video or audio patterns from the above virtual drivers, is, together with further desktop content transferred via the upstream to docking host, e.g. an upstream 443 via the remote desktop server unit 251 and remote desktop client unit 210, or as a separate AV upstream 442.

Any video data from video input unit 213 is forwarded to the AV router. The AV router determines the location of the first video pattern and/or second video pattern in the second AV data, e.g. using a video pattern detector 411. The location of one or more video patterns as detected is processed to insert corresponding video content originating from webcam and/or video content originating from the external A/V source into video content for display 204 at the locations received from video pattern detector 411, e.g. via a audio video multiplexer. The resulting multiplexed video content is then forwarded to the display 204. Audio originating from the external AV source via the network 230 is forwarded via audio unit 214 to the speaker(s) 203 for playback. Finally, audio input from audio input unit 213 and the microphone is rendered into the external A/V stream.

In the above example, the video content from the webcam, external video content, audio from the microphone and external audio are no longer transferred to the dockee, but instead are directly processed by docking host via the AV router, thus saving bandwidth on the wireless connection. Instead, on the wireless connection, there is transferred the predetermined pattern. Even using a dockee and application that are not aware of the routing and AV data replacement, the system achieves an improvement of the bandwidth by proper selection of the predetermined pattern for video and/or audio. Said pattern, where present in the upstream, replaced by the original video and/or audio. In addition, further routing and/or rendering commands may be exchanged with a dockee comprising a dockee router, so as to further enhance the replacement process, and/or reduce the amount of data of the predetermined pattern in the downstream.

In practical embodiments, the predetermined pattern may include various elements. Basically, the pattern is chosen to require little bandwidth when transmitted, usually compressed by a video compression function. A suitable example pattern may have a single background color, e.g. black or zero intensity pixels. This background may constitute the predetermined pattern. However, for example to avoid the application acting as if no video is connected, the predetermined video pattern may have one or more objects, for example geometrical objects like disc, square or rectangle. A few objects may be shown in a predetermined arrangement, for example having different sizes. Such objects or arrangement enable the AV router to detect where and whether a part of the original video has been inserted, and whether it has been scaled or cropped, as the pattern will be scaled/cropped by the application before insertion in the second AV data so as to enable the AV router in the host to detect both the area covered by the pattern, and scaling and/or cropping. Also, the pattern may have elements having a single foreground color, or an arrangement of elements having different predetermined colors. It is noted that the word predetermined in this context only means that the AV router is aware of the pattern as inserted in the first AV data, so as to be enabled to detect the returned pattern in the second AV data. Also, the predetermined pattern may include an audio pattern of silence, which is easily replaced as it may be ignored and superseded by inserting the original audio. Also, the pattern may include an audio pattern of a sequence of predetermined sounds. This may for example be a sine wave or a pattern of clicks, which may be removed by a matched filter in the AV router before adding the original sound. Also, the strength of the sound elements may be detected to enable sound level control while mixing the original sound from the microphone 202 and sound generated by the application in the dockee device. Some predetermined sound element may also be inserted based on actual sound input to enable sound dependent functions of the application, like speech detection and sound level control.

Optionally, the predetermined pattern may include temporal information, such as a gradual or stepwise change of the pattern, size, color or number of elements, etc. The AV router may be arranged for using the temporal information to determine a delay between sending the first data in the downstream and receiving the second AV data in the upstream, and delaying AV content from the AV input device according to the determined delay before said replacing so as to synchronize the AV data to be rendered.

A method of wireless docking between a host device and a dockee device is based on wireless communication between a host device and one or more dockee devices. The host device and mobile device are as described above. The method includes processing the downstream and the upstream so as to replace the first AV data by a predetermined pattern before transmitting the downstream to the dockee device, and replace at least part of the second AV data by at least part of the first AV data after receiving the upstream from the dockee device and before rendering via said AV rendering function.

Although the invention has been mainly explained by embodiments using wireless docking, the invention is also suitable for any wireless system where wireless devices need to connect to, or share, one or more audio and/or video peripherals. It is to be noted that the invention may be implemented in hardware and/or software, using programmable components.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A wireless docking system comprising a host device and a dockee device, the host device being configured for rendering at least one of audio and video data, the host device comprising at least one processor configured for:
   accommodating wireless communication,
   providing at least one rendering function to a remote client for enabling rendering the audio data via a sound device or the video data via a screen,
   enabling transmission of a first data to the dockee device, and
   receiving second data to be rendered from the dockee device,
   the dockee device comprising at least one other processor configured for:
   accommodating the wireless communication,
   enabling said at least one rendering function,
   and the host device further comprising:
      a router configured for processing the first and second data so as to replace the first data by a predetermined pattern before transmitting to the dockee device, receiving rendering commands from the dockee device, the rendering commands being indicative of the replacing at least part of the second data by at least part of the first data, and replace at least part of the second data by at least part of the first data after receiving from the dockee device and before rendering via said at least one rendering function, wherein the dockee device is configured for including the predetermined pattern into the second data, and the router is configured for recognizing the predetermined pattern in the second data, and replacing the second data corresponding to said recognized pattern by at least part of the first data.

2. The device as claimed in claim 1, wherein the router is configured for:
   recognizing the predetermined pattern in a patterned area of display output data in the second data, and
   replacing the second data in the patterned area by a corresponding amount of the first data.

3. The device as claimed in claim 2, wherein the router is configured for:
   recognizing, in the patterned area, at least one of a scaling and cropping of the predetermined pattern,
   processing the first data corresponding to the at least one of scaling and cropping, and
   replacing the second data in the patterned area by a corresponding amount of the processed first data.

4. The device as claimed in claim 1, wherein the predetermined pattern includes at least one of:

a video pattern having a single background color;
a video pattern having one or more geometrical objects;
a video pattern having a single foreground color;
an audio pattern of silence;
an audio pattern of a sequence of predetermined sounds;
temporal information, and the router is configured for using the temporal information to determine a delay between sending the first data and receiving the second data, and delaying content from an input device according to the determined delay before said replacing so as to synchronize the data to be rendered.

5. A host device for use in a wireless docking system, the host device being configured for rendering at least one of audio and video data, the host device comprising at least one processor configured for:
accommodating wireless communication,
providing at least one rendering function to a remote client for enabling rendering the audio data via a sound device or the video data via a screen,
enabling transmission of a first data to a dockee device, and receiving second data to be rendered from the dockee device, and
a router configured for processing the first and second data so as to replace the first data by a predetermined pattern before transmitting to the dockee device, receive rendering commands from the dockee device, the rendering commands being indicative of the replacing at least part of the second data by at least part of the first data, and replace at least part of the second data by at least part of the first data after receiving from the dockee device and before rendering via said at least one rendering function, wherein the router is configured for recognizing the predetermined pattern in the second data, and replacing the second data corresponding to said recognized pattern by at least part of the first data.

6. The device as claimed in claim 5, wherein the rendering commands comprise video rendering commands, comprising at least one of:
a command indicative of an area of the screen for rendering the first data;
a command indicative of an area of the first data to be rendered on the screen;
a command indicative of a pattern in the second data indicative of the rendering area;
a command indicative of a reference point for rendering the first data;
a command indicative of a visual marker to be detected in the second data for positioning the first data;
a command indicative of an indicator for selecting a predefined location for rendering the first data.

7. The device as claimed in claim 5, wherein the rendering commands comprise graphical rendering commands, comprising at least one of:
a command indicative of a graphical element to be rendered;
a command indicative of a location of rendering a graphical element;
a command indicative of a time indication for starting, stopping or temporarily displaying a graphical element;
a command indicative of a graphical user interface for enabling interaction with a user;
a command indicative of graphical control elements for enabling control via a user action.

8. The device as claimed in claim 5, wherein the rendering commands comprise audio rendering commands, comprising at least one of:
a command indicative of a gain factor for rendering audio data of the first data;
a command indicative of a mixing ratio for rendering a combination of audio data of the first data and audio data of the second data.

9. A method of wireless docking for a host device in a wireless docking system comprising a host device and a dockee device, the host device being configured for rendering at least one of audio and video data, the method comprising:
providing at least one rendering function to a remote client for enabling rendering the audio data via a sound device or the video data via a screen,
processing a first and second data so as to replace the first data by a predetermined pattern before transmitting to the dockee device; and
after receiving the second data from the dockee device and before rendering via the at least one rendering function:
receiving rendering commands from the dockee device, the rendering commands being indicative of the replacing at least part of the second data by at least part of the first data,
recognizing the predetermined pattern in the second data, and
replacing the second data corresponding to said recognized pattern by at least part of the first data.

10. The method of claim 9, the method comprising:
cooperating with the remote client for enabling the at least one rendering function, and
including the predetermined pattern into the second data.

11. A non-transitory computer-readable medium having one or more executable instructions stored thereon, which when executed by a processor, cause the processor to perform a method for carrying out a wireless docking for a host device in a wireless docking system comprising a host device and a dockee device, the host device being configured for rendering at least one of audio and video data, the method comprising:
providing at least one rendering function to a remote client for enabling rendering the audio data via a sound device or the video data via a screen;
processing a first and second data so as to replace a first data by a predetermined pattern before transmitting to the dockee device; and
after receiving the second data from the dockee device and before rendering via the at least one rendering function;
receiving rendering commands from the dockee device, the rendering commands being indicative of the replacing at least part of the second data by at least part of the first data,
recognizing the predetermined pattern in the second data; and
replacing the second data corresponding to said recognized pattern by at least part of the first data.

* * * * *